United States Patent [19]

Chevalier

[11] Patent Number: 5,145,452
[45] Date of Patent: Sep. 8, 1992

[54] FISH SLIMING AND SCRAPING TOOL

[76] Inventor: Robert L. Chevalier, 333 Katlian St., Sitka, Ak. 99835

[21] Appl. No.: 741,916

[22] Filed: Aug. 8, 1991

[51] Int. Cl.$^5$ ............................................. A23C 1/00
[52] U.S. Cl. ................................... 452/118; 452/106; 452/121
[58] Field of Search ............... 452/118, 121, 120, 110, 452/106, 198

[56] References Cited

U.S. PATENT DOCUMENTS

| | | |
|---|---|---|
| 2,042,273 | 5/1936 | Okun . |
| 2,148,944 | 2/1939 | Helm . |
| 2,508,957 | 5/1950 | Lynn .................................... 452/118 |
| 2,547,608 | 4/1951 | Toti et al. ............................ 452/118 |
| 3,048,884 | 8/1962 | Robichaux . |

Primary Examiner—Bruce M. Kisliuk
Assistant Examiner—Lawrence Cruz
Attorney, Agent, or Firm—Henderson & Sturm

[57] ABSTRACT

A fish scraping and sliming tool (10) for the removal of the bloodline (101) from the body cavity (103) of a fish (100); wherein, the tool comprises a handle unit (11) and a scraping head scraping edge (40) which are angularly offset from the axis of a handle extension member (30) by approximately the same angular value such that the axis of the users forearm will be angularly disposed at an angle of approximately 45° relative to the axis of the handle unit (11) when the user grasps the handle unit in the neutral wrist position.

5 Claims, 2 Drawing Sheets

FISH SLIMING AND SCRAPING TOOL

TECHNICAL FIELD

The present invention relates to hand held fish cleaning tools in general, and in particular to hand held fish sliming and scraping tools.

BACKGROUND ART

As can be seen by reference to the following U.S. Pat. Nos. 2,148,944; 3,048,884; 4,615,079; and 2,042,273; the prior are is replete with myriad and diverse hand held scraping type tools for use on both fish as well as other work surfaces.

While all of the aforementioned prior art constructions are more than adequate for the basic purpose and function for which they have been specifically designed, these prior art tools with the notable exception of the U.S. Pat. No. 4,615,079 reference are neither designed nor suited for the removal of the blood lines that run down the center of the interior body cavity of fish in general.

In addition while there is not a problem with slitting the belly of most fish to remove the bloodline; there are certain instances such as encountered with sablefish wherein, the wholesaler requires that the belly skin be left intact thereby mandating the use of a long handled narrow scraping tool to both rupture the blood vessel membrane and effect its removal from a generally conical body cavity.

As a consequence of the foregoing situation, there has existed a longstanding need for a new type of sliming and scraping tool that would not only produce the desired results in a simple straight forward manner; but would also accomplish those objectives with a minimum amount of stress and strain being exerted on the part of the fish cleaner; and, the provision of such a construction is a stated objective of the present invention.

DISCLOSURE OF THE INVENTION

Briefly stated, the fish sliming and scraping tool that forms the basis of the present invention comprises in general: a handle unit; and angled intermediate extension unit; and a scrapper head unit.

The handle unit comprises a newly configured hollow handle member having a quasi-rectangular cross-sectional configuration which enhances the users grip on the handle member and the improved grip is further complimented by a raised shelf element and a roughly textured surface formed on the external periphery of the handle member.

As will be explained in greater detail further on in the specification, all of the prior art hand held fish scraping and sliming tools employ a straight line axial orientation between their handle, handle extension, and scraper head; which produces an unnatural ulnar deviation in the users wrist and tendons which will ultimately produce a repetitive motion injury such as carpel tunnel syndrome.

However due to the unique angular offset between the handle unit and the handle extension unit of the present invention; as well as a similar angular orientation of the scraper blade tip of the scraper blade unit with the handle extension unit; the geometry of the scraper tool of this invention places the users grip axis at the proper angle to the users forearm to produce an anatomically neutral wrist position in which the wrist is neither bent, flexed or twisted during the fish cleaning procedure.

BRIEF DESCRIPTION OF THE DRAWINGS

These and other attributes of the invention will become more clear upon a thorough study of the following description of the best mode for carrying out the invention, particularly when reviewed in conjunction with the drawings, wherein.

BEST MODE FOR CARRYING OUT THE INVENTION

Figure 1:
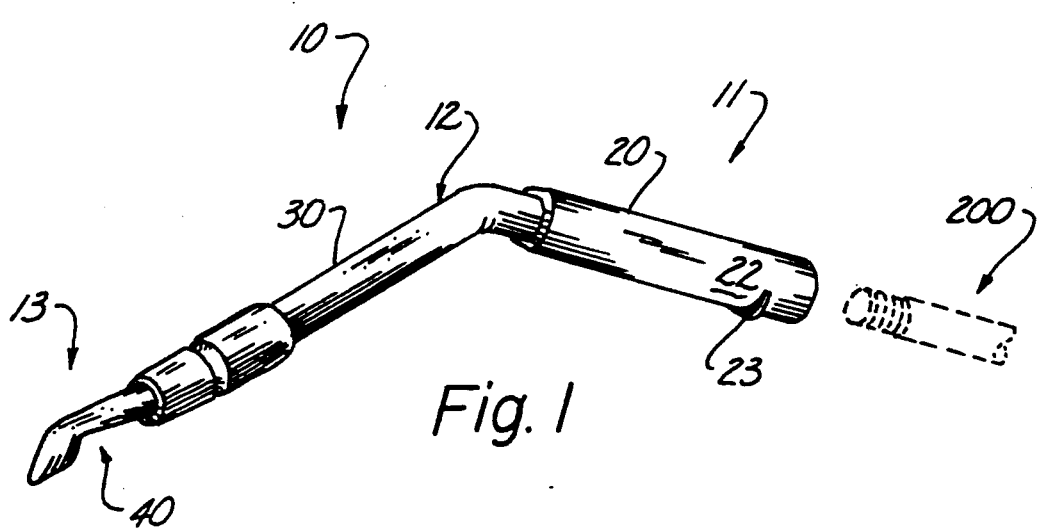
FIG. 1 is an isolated perspective view of the fish sliming and scraping tool that forms the basis of the present invention.

As can be seen by reference to the drawings, and in particular to FIG. 1, the fish sliming and scraping tool that forms the basis of the present invention is designated generally by the reference numeral (10). The tool (10) comprises in general: a handle unit (11); a handle extension unit (12) and a scraper head unit (13).

Figure 2:
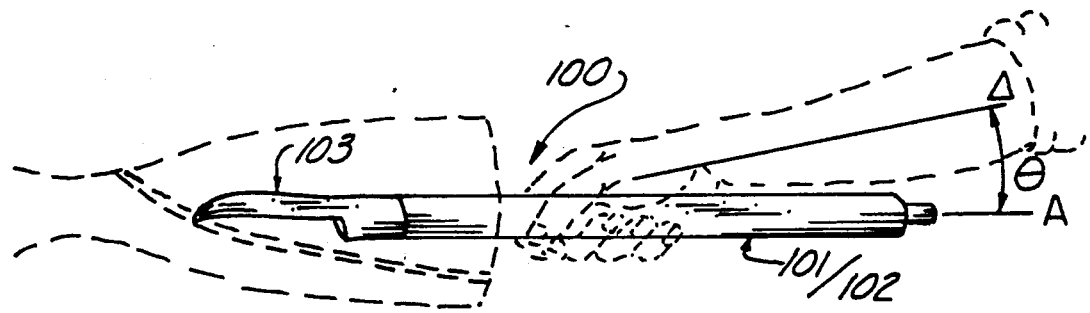
FIG. 2 is a side plan view of the currently employed prior art tool in use.

As was mentioned previously and as is clearly illustrated in FIG. 2, the prior art fish scraping and sliming tool (100) that is currently in commercial usage, also comprises a combined elongated cylindrical handle and extension unit (101/102) and a scraper head unit (103); which are axially aligned with one another along a horizontal "A" axis; and, wherein the users forearm has an axis "A" which is aligned at an angle $\theta$ relative to the axis of the handle unit (101); wherein the maximum value of $\theta$ is no greater than 30°.

Figure 3:
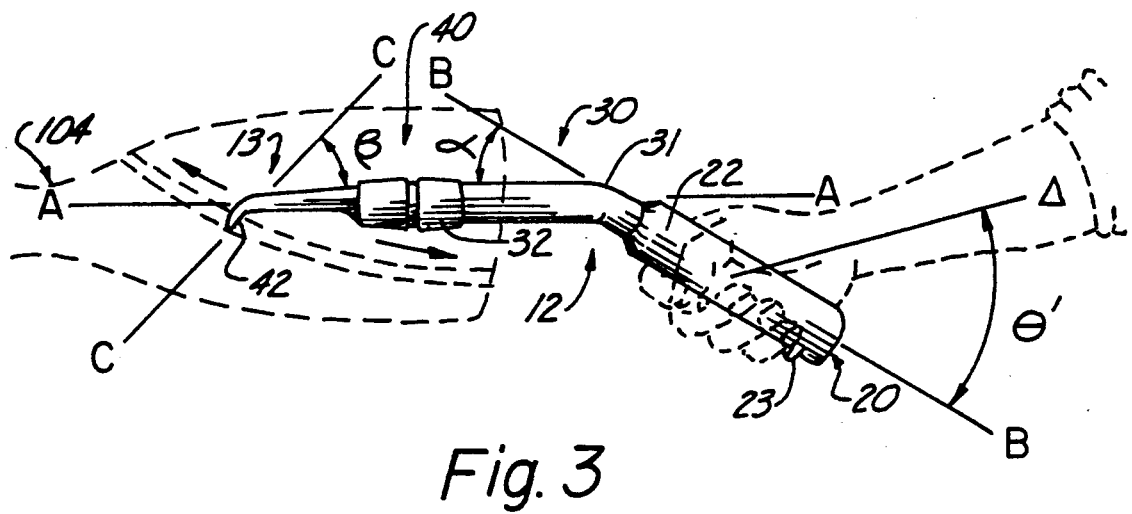
FIG. 3 is a side plan view of the tool of this invention in use.
Figure 4:
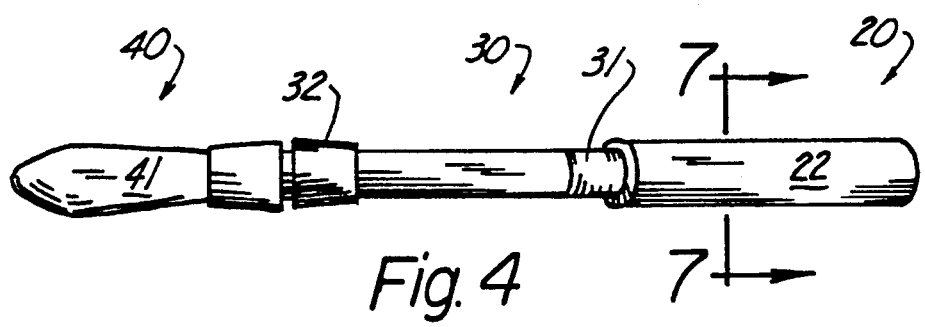
FIG. 4 is a top plan view of the invention.
Figure 7:
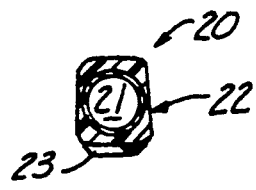
FIG. 7 is a cross-sectional view taken though line 7—7 of FIG. 4.

Embarking now on a detailed description of the best mode for carrying out the preferred embodiment of the present invention it can be seen by reference to FIGS. 1, 3, and 7, that the handle unit (11) comprises an elongated hollow handle member (20) having an enlarged internal bore (21) formed therein. In addition the exterior of the elongated hollow handle member (20) is provided with a roughened non-slip friction surface (22) to enhance the users grip on the periphery of the handle member (20); and, is further provided with an outwardly projecting shelf element (23) that will prevent the users circled fingers from traveling rearwardly relative to the handle member (20).

Furthermore, as can be seen particularly be reference to FIG. 7 the cross-sectional configuration of the exterior surface (22) of the handle member (20) defines a generally round edged trapezoidal configuration which offers far superior gripping characteristics compared to a cylindrically shaped configuration. As can best be seen by reference to FIG. 3 the elongated handle member (20) is axially aligned along an angular axis "B"; wherein, the handle axis "B" forms an angle $\theta'$ relative to the users forearm axis "A"; when the user grasps the handle member (20) in the neutral wrist position and, wherein the minimum value of θ' is 40°.

Figure 5:
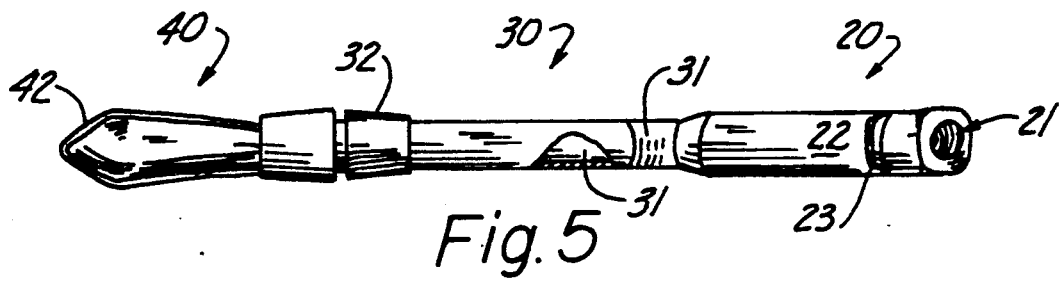
FIG. 5 is a bottom plan view of the invention.
Figure 6:
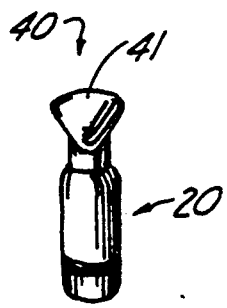
FIG. 6 is a front plan view of the invention.

As shown in FIGS. 1, 3, and 5 the extension unit (12) comprises a elongated hollow tubular handle extension member (30) having a central bore (31) formed therein; wherein, at least a significant portion of the extension member (30) is aligned along the horizontal axis "A".

As can best be seen by reference to FIG. 3 both the outboard and intermediate portions of the handle extension member (30) are aligned along the axis A; whereas, the inboard end of the handle extension member (30) is provided with a curved transition none designated generally as (31); where the centerline of the handle extension member (30) is deflected from alignment with axis "A" to alignment with axis "B".

Still referring to FIG. 3, it can be seen that the outboard end of the handle extension member (30) is provided with a coupling element (32) which operatively engages the handle extension member (30) with the scraper head unit (13).

As shown in FIGS. 3 through 6 the scraper head unit (40) comprises an elongated scraper head member (41) having a downwardly angled generally curvilinear sharpened scraping edge (42) formed on its outboard end; wherein, the scraping edge (42) is generally aligned in an axial plane "C"; wherein, the axial plane "C" is angularly offset from the axis "A" by an angle β. Furthermore as shown in FIG. 3, the value of the angle α is approximately equal to the value of the angle β; wherein, the values of the angles α and β are both approximately equal to 45°.

Figure 8:
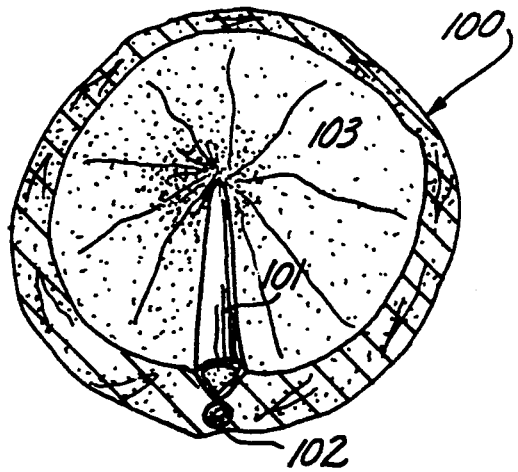
FIG. 8 is a typical view into the body cavity of a sablefish.
Figure 9:
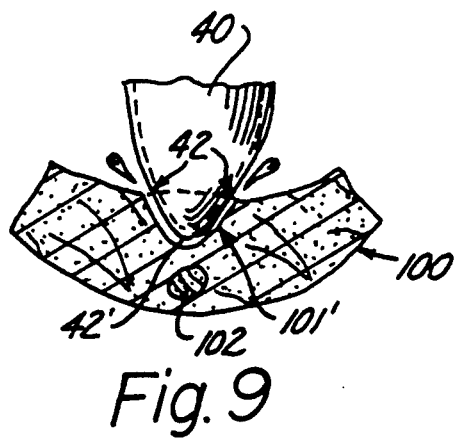
FIG. 9 is an enlarged detail view of the engagement of the scraper blade with the membrane and bloodline cavity of a fish.

As can best be appreciated by reference to FIGS. 3, 8 and 9, the fish scraping tool (10) which forms the basis of the present invention is used to remove the bloodline (10) from the body cavity (103) of a fish (100); wherein, the bloodline (101) is positioned over the spine (102) of the fish (100) and covered by a thin membrane.

Once the fish (100) has been decapitated and the internal organs removed from the body cavity the leading edge or point (42') of the scraping edge (42) is used to rupture the bloodline membrane (101) as the cutting head member (40) is moved forward in the body cavity (103) towards the anal cavity (104) of the fish (100).

Then when the point (42') of the scraper head member (40) reaches the rear of the body cavity (103) the leading edge (42') of the scraper head member (40) will engage the bloodline recess (101') thereby effecting the complete removal of the bloodline (101) from within the body cavity (103).

Turning now to FIGS. 1 and 5 it can be seen that the bores (21) and (31) in the hollow handle member (20) and handle extension member (30) are in open fluid communication with the scraper head member (40). The reason for this open fluid communication is illustrated in FIG. 1; wherein, this invention further contemplates the connection of a water hose (200) via any suitable fluid coupling means (not shown) to introduce a stream of water to the scraping head member (40) to flush the blood and vessel particles out of the body cavity (103) as the tool (10) is being withdrawn from the cavity.

Having thereby described the subject matter of the present invention, it should be apparent that many substitutions, modifications and variations of the invention are possible in light of the above teachings. It is therefore to be understood that the invention as taught and described herein is only to be limited to the extent of the breadth and scope of the appended claims.

I claim:

1. A fish scraping and sliming tool for removing the membrane and bloodline from the body cavity of a fish; wherein the tool comprises
    a handle unit comprising an elongated handle member aligned along a first axis
    an extension unit comprising an elongated handle extension member substantially aligned along a second axis; wherein, said first axis is angularly offset from said second axis by an angle of approximately 45°; and,
    a scraper head unit having a generally tapered outboard end dimensioned to be received in the body cavity surrounding said bloodline; wherein, said tapered outboard end is provided with a generally smooth continuous curvilinear scraping edge surface transversely aligned along an axial plane; wherein, said axial plane is angularly offset from said second axis by an angle of approximately 45°; such that, when the users curled hand grasps the handle unit, the users wrist is disposed in a neutral position, and the users forearm is aligned along a fourth axis which is angularly offset from said first axis by an angle of approximately 40°; so that the users wrist and forearm are ergonomically aligned for the push-pull motion of the tool which will sequentially rupture and then remove the membrane and bloodline from the body cavity of the fish.

2. The tool as in claim 1 wherein, both the handle member and the handle extension member are hollow and in open fluid communication with the scraper head unit.

3. The tool as in claim 2 wherein the handle member is provided with a generally round edged trapezoidal cross-sectional configuration.

4. The tool as in claim 2; wherein, the handle member is provided with non-slip surface coating.

5. The tool as in claim 2; wherein, the lower portion of the handle member is further provided with an outwardly projecting shelf element.

* * * * *